United States Patent
Wu (10) Patent No.: US 9,294,255 B2
(45) Date of Patent: Mar. 22, 2016

(54) METHOD OF HANDLING ENHANCED PHYSICAL DOWNLINK CONTROL CHANNEL AND RELATED COMMUNICATION DEVICE

(71) Applicant: HTC Corporation, Taoyuan County (TW)

(72) Inventor: Chih-Yao Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 376 days.

(21) Appl. No.: 14/019,566

(22) Filed: Sep. 6, 2013

(65) Prior Publication Data

US 2014/0064215 A1    Mar. 6, 2014

Related U.S. Application Data

(60) Provisional application No. 61/697,318, filed on Sep. 6, 2012.

(51) Int. Cl.
| | |
|---|---|
| *H04W 4/00* | (2009.01) |
| *H04L 5/00* | (2006.01) |
| *H04W 72/04* | (2009.01) |

(52) U.S. Cl.
CPC ............ *H04L 5/0092* (2013.01); *H04L 5/0053* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 8,537,862 | B2 * | 9/2013 | Blankenship et al. | 370/483 |
| 8,842,622 | B2 * | 9/2014 | Zhang et al. | 370/329 |
| 2013/0039284 | A1 * | 2/2013 | Marinier et al. | 370/329 |
| 2013/0039299 | A1 * | 2/2013 | Papasakellariou et al. | 370/329 |
| 2013/0121267 | A1 * | 5/2013 | Koorapaty et al. | 370/329 |
| 2013/0195068 | A1 * | 8/2013 | Baker et al. | 370/330 |
| 2013/0301434 | A1 * | 11/2013 | Krishnamurthy et al. | 370/252 |
| 2014/0126487 | A1 * | 5/2014 | Chen et al. | 370/329 |

OTHER PUBLICATIONS

European patent application No. 13020088.4, European Search Report mailing date: Jan. 3, 2014.
Office action mailed on Jan. 17, 2014 for the European application No. 13020088.4, cover page + p. 1-5.
ZTE, "Discussion on ePDCCH candidates and search space design", 3GPP TSG RAN WG1 Meeting #70, R1-123374, Aug. 13-17, 2012, Qingdao, China, p. 1-8.

(Continued)

*Primary Examiner* — Steven H Nguyen
(74) *Attorney, Agent, or Firm* — Winston Hsu; Scott Margo (57) ABSTRACT

A method of handling an enhanced physical downlink control channel (EPDCCH) for a network of a wireless communication system comprises calculating the average number of available resource elements (REs) in one control channel element (CCE) for EPDCCH in a physical resource block (PRB); selecting an aggregation level from a first aggregation level set; calculating the number of available REs in a EPDCCH for the selected aggregation level according to the selected aggregation level and the average number of available REs in one CCE; selecting a first candidate number set according to a second comparison result between the number of available REs in the EPDCCH for the selected aggregation level and a second threshold; and determining an aggregation level and the number of blind decoding candidates corresponding to the determined aggregation level, for transmitting control information dedicated to a user equipment.

10 Claims, 4 Drawing Sheets

(56) References Cited

OTHER PUBLICATIONS

HTC, "Remaining Details of Search Space and Aggregation Levels of EPDCCH", 3GPP TSG RAN WG1 Meeting #71, R1-124959, Nov. 12-16, 2012, New Orleans, USA, XP050662878.
MCC Support, "Draft Report of 3GPP TSG RAN WG1 #70 v0.1.0 (Qingdao, China, Aug. 13-17, 2012)", 3GPP TSG RAN WG1 Meeting #70bis, R1-12xxxx, Oct. 8-12, 2012, San Diego, USA, XP050661944, p. 1-113.
3GPP TS 36.213 V10.6.0 (Jun. 2012) Technical Specification 3rd Generation Partnership Project; Technical Specification Group Radio Access Network; Evolved Universal Terrestrial Radio Access (E-UTRA); Physical layer procedures (Release 10).

* cited by examiner

METHOD OF HANDLING ENHANCED PHYSICAL DOWNLINK CONTROL CHANNEL AND RELATED COMMUNICATION DEVICE

CROSS REFERENCE TO RELATED APPLICATIONS

This application claims the benefit of U.S. Provisional Application No. 61/697,318, filed on Sep. 6, 2012 and entitled "Method and Apparatus for Blind Decoding Candidate Assignment of Enhanced Downlink Control Channel for OFDMA Systems", the contents of which are incorporated herein in their entirety.

BACKGROUND OF THE INVENTION

1. Field of the Invention

The present invention relates to a method used in a wireless communication system and related communication device, and more particularly, to a method of handling an enhanced physical downlink control channel (EPDCCH) and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmission/reception, UL multiple-input multiple-output (MIMO), etc. For a UE and an eNB to communicate with each other in the LTE-A system, the UE and the eNB must support standards developed for the LTE-A system, such as the 3GPP Rel-10, Rel-11, or later versions.

A physical downlink control channel (PDCCH) (i.e., legacy PDCCH) is used for carrying control information in a wireless communication system conforming to the 3GPP Rel-8, Rel-9 and/or Rel-10 standards. As the 3GPP standard is improved, the PDCCH is not suitable for advanced network deployments and transmission schemes such as heterogeneous networks and the CoMP due to its inability of frequency domain inter-cell interference cancellation (FDM-ICIC), lack of finer granularity and insufficient capacity. In 3GPP Rel-11 standard, an enhanced physical downlink control channel (EPDCCH) is proposed to carry the control information under various scenarios flexibly and robustly. It is agreed that the number of enhanced control channel elements (ECCEs) for the EPDCCH in a physical resource block (PRB) is fixed. The number of the ECCEs in the PRB can be 2 or 4, and may depend on a length of the cyclic prefix (CP) and a type of the subframe.

It is noted that the basic unit for the EPDCCH transmission is the ECCE. The ECCEs can be aggregated for an EPDCCH transmission. The number of ECCEs aggregated is called an aggregation level. The aggregation level is usually a power of 2, and EPDCCH aggregation level could be 1, 2, 4, 8, 16 and 32 ECCEs. However, the number of available resource elements (REs) in an ECCE varies a lot in different cases, and may depend on the presence of other signals such as a cell-specific reference signal (CRS) and/or the PDCCH. As a result, it is difficult for the eNB to use the ECCEs efficiently. For example, resources of the EPDCCH may be overused for transmitting control information when one ECCE contains more resource elements and it is enough using one ECCE for most cases, and the resources are wasted. Otherwise, resources of the EPDCCH may be underused for transmitting the control information when one ECCE contains less resource elements, and the eNB is forced to use much more ECCEs. Therefore, the blocking probability may be high. System capacity is limited if resources of the EPDCCH are not used efficiently.

Thus, transmitting the control information via the EPDCCH efficiently while maintaining a low blocking probability and efficient resource usage are an important problem to be solved.

SUMMARY OF THE INVENTION

The present invention therefore provides a method and related communication device for handling the EPDCCH to solve the abovementioned problem.

A method of handling an enhanced physical downlink control channel (EPDCCH) for a network of a wireless communication system comprises calculating the average number of available resource elements (REs) in one control channel element (CCE) for physic downlink control channel (PDCCH) in a physical resource block (PRB); selecting an aggregation level from a first aggregation level set of the plurality of aggregation level sets; calculating the number of available REs in a PDCCH for the selected aggregation level according to the selected aggregation level and the average number of available REs in one CCE; selecting a first candidate number set from a plurality of blind decoding candidate number sets according to a second comparison result between the number of available REs in the PDCCH for the selected aggregation level and a second threshold, wherein each blind decoding candidate number set comprises a plurality of numbers, each number indicating the number of blind decoding candidates associated with a corresponding aggregation level; and determining an aggregation level from the first aggregation level set and determining the number of blind decoding candidates corresponding to the determined aggregation level from the first candidate number set, for transmitting control information dedicated to a user equipment (UE) of the wireless communication system.

A method of handling an enhanced physical downlink control channel (EPDCCH) for a communication device of a wireless communication system comprises calculating the average number of valid resource elements (REs) in one control channel element (CCE) for physic downlink control channel (PDCCH) in a physical resource block (PRB); selecting an aggregation level from a first aggregation level set of the plurality of aggregation level sets; calculating the number of valid REs in a PDCCH for the selected aggregation level according to the selected aggregation level and the average number of valid REs in one CCE; selecting a first candidate number set from a plurality of blind decoding candidate number sets according to a second comparison result between the number of valid REs in the PDCCH for the selected aggregation level and a second threshold, wherein each blind decoding candidate number set comprises a plurality of numbers, each number indicating the number of blind decoding candidates associated with a corresponding aggregation level; and selecting an aggregation level from the first aggregation level set and selecting the number of blind decoding candidates corresponding to the selected aggregation level from the first candidate number set, for performing blind decoding to obtain control information dedicated to the UE transmitted from a network of the wireless communication system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
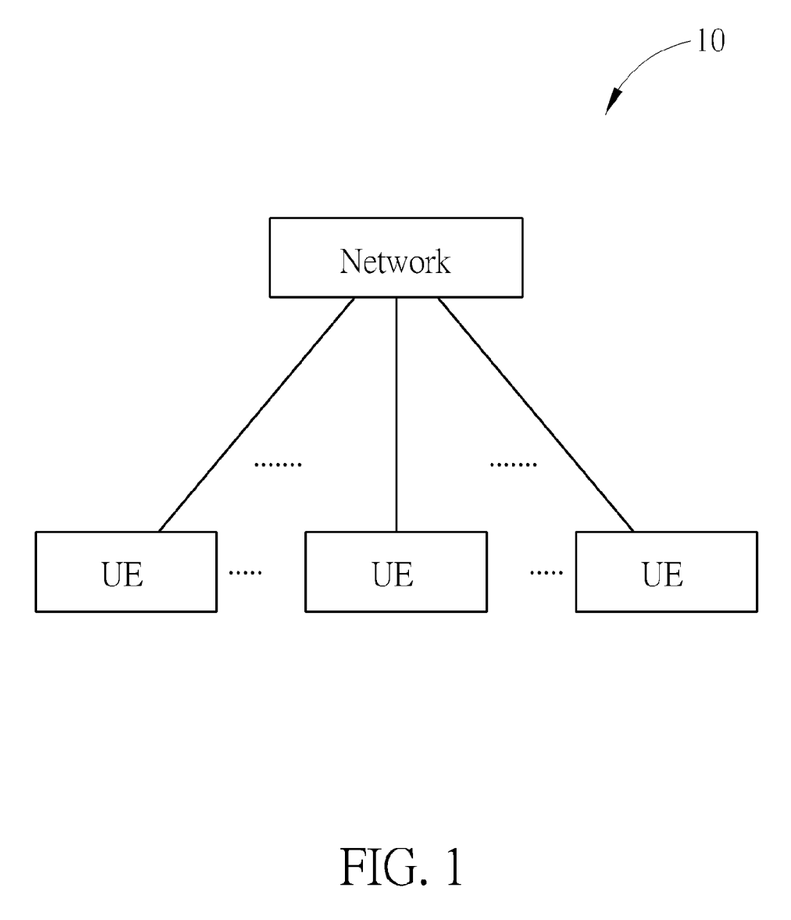
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of user equipments (UEs). In FIG. 1, the network and the UEs are simply utilized for illustrating the structure of the wireless communication system 10. Practically, the network may be a universal terrestrial radio access network (UTRAN) comprising a plurality of Node-Bs (NBs) in a universal mobile telecommunications system (UMTS). Alternatively, the network may be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network may also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE, the information may be processed only by the UTRAN/E-UTRAN and decisions corresponding to the information are made at the UTRAN/E-UTRAN. In another example, the UTRAN/E-UTRAN may forward the information to the core network, and the decisions corresponding to the information are made at the core network after the core network processes the information. In another example, the information may be processed by both the UTRAN/E-UTRAN and the core network, and the decisions are made after coordination and/or cooperation are performed by the UTRAN/E-UTRAN and the core network. A UE may be a mobile phone, a laptop, a tablet computer, an electronic book or a portable computer system but is not limited. In addition, the network and the UE may be seen as a transmitter or a receiver according to direction, e.g., for an UL, the UE is the transmitter and the network is the receiver, and for a DL, the network is the transmitter and the UE is the receiver. More specifically, for the network, the direction of the transmission is DL, and the direction of the reception is UL. For the UE, the direction of the transmission is UL, and the direction of the reception is DL.

Figure 2:
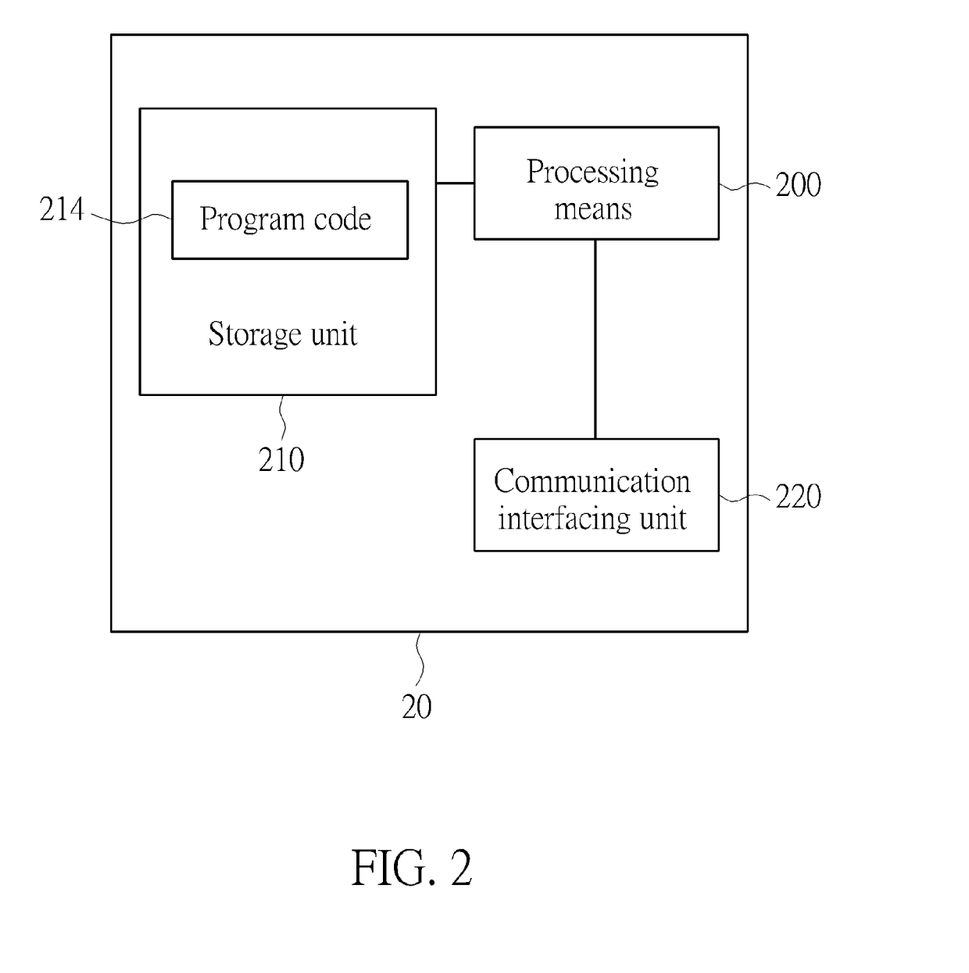
FIG. 2 is a schematic diagram of a communication device according to an example of the present invention.

Please refer to FIG. 2, which is a schematic diagram of a communication device 20 according to an example of the present invention. The communication device 20 may be a UE or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that stores a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
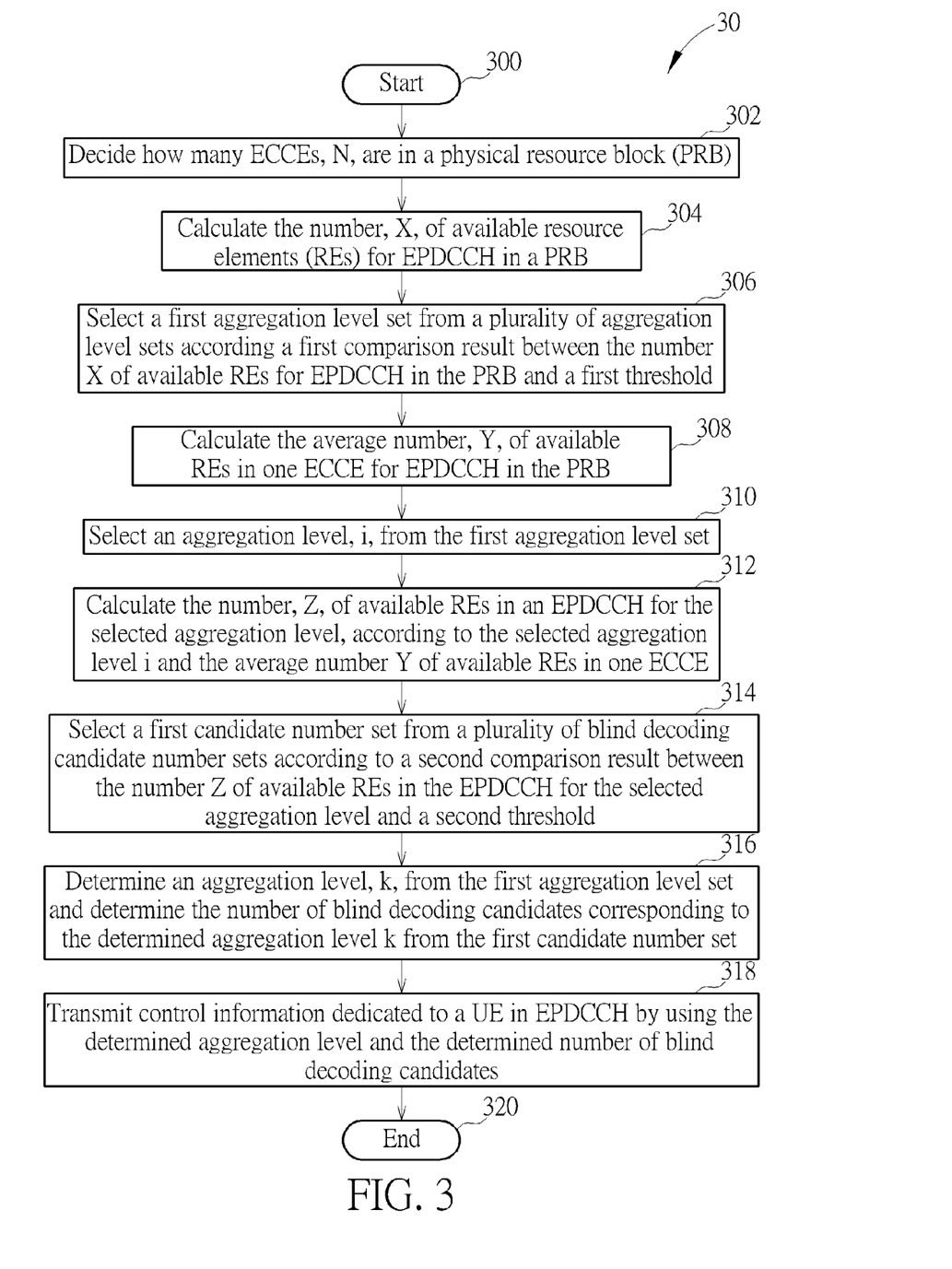
FIG. 3 is a flowchart of a process according to an example of the present invention.

Please refer to FIG. 3, which is a flowchart of a process 30 according to an example of the present invention. The process 30 is utilized in the network shown in FIG. 1, for handling an enhanced physical downlink control channel (EPDCCH). The process 30 may be compiled into the program code 214 and includes the following steps:

Step 300: Start.

Step 302: Decide how many ECCEs, N, are in a physical resource block (PRB).

Step 304: Calculate the number, X, of available resource elements (REs) for EPDCCH in a PRB.

Step 306: Select a first aggregation level set from a plurality of aggregation level sets according a first comparison result between the number X of available REs for EPDCCH in the PRB and a first threshold.

Step 308: Calculate the average number, Y, of available REs in one ECCE for EPDCCH in the PRB.

Step 310: Select an aggregation level, i, from the first aggregation level set.

Step 312: Calculate the number, Z, of available REs in an EPDCCH for the selected aggregation level, according to the selected aggregation level i and the average number Y of available REs in one ECCE.

Step 314: Select a first candidate number set from a plurality of blind decoding candidate number sets according to a second comparison result between the number Z of available REs in the EPDCCH for the selected aggregation level and a second threshold.

Step 316: Determine an aggregation level, k, from the first aggregation level set and determine the number of blind decoding candidates corresponding to the determined aggregation level k from the first candidate number set.

Step 318: Transmit control information dedicated to a UE in EPDCCH by using the determined aggregation level and the determined number of blind decoding candidates.

Step 320: End.

First note that in Step 302, the network may decide how many enhanced control channel elements (ECCEs), N, are included in a physical resource block (PRB). It is agreed in 3GPP standard that the number N of ECCEs for EPDCCH in a PRB is fixed and N can be 2 or 4. To describe the embodiment of the present invention clearly, following configurations are used in examples but not limit the embodiment of the present invention: two EPDCCH aggregation level sets {1, 2, 4, 8, 16} and {2, 4, 8, 16, 32}, and two blind decoding candidate number sets {6, 6, 2, 1, 1} and {8, 4, 2, 1, 1}, wherein when the aggregation level=1 is selected from the first aggregation level set {1, 2, 4, 8, 16} or the aggregation level=2 is selected from the second aggregation level set {2, 4, 8, 16, 32}, the number of blind decoding candidates is determined to be 6 (if the first candidate number set {6, 6, 2, 1, 1} is used) or 8 (if the second candidate number set {8, 4, 2, 1, 1} is used), corresponding to the determined aggregation level.

The present invention is related to how to select/determine the proper aggregation level set and the proper blind decoding candidate number set to be used for handling EPDCCH transmission/reception, for both of the network side and the UE side.

According to Step 304, the network calculates the number, X, of available resource elements (REs) for EPDCCH in a PRB. According to Step 306, the network selects a first aggregation level set from a plurality of aggregation level sets according to a first comparison result between the number X of available REs for EPDCCH in the PRB and a first threshold, wherein each aggregation level set comprising numbers indicating different aggregation levels. Note that in current 3GPP agreement, an EPDCCH aggregation level may be selected from a set of aggregation levels, such as {1, 2, 4, 8, 16} or {2, 4, 8, 16, 32} (ECCEs). For example, according to Step 306, the network selects the aggregation level set {1, 2, 4, 8, 16} when the first comparison result indicates that the number X of available REs for EPDCCH in the PRB is greater than the first threshold (e.g. 104 REs); otherwise, the network selects the aggregation level set {2, 4, 8, 16, 32} when the first comparison result indicates that the number X of available REs for EPDCCH in the PRB is not greater than the first threshold.

According to Step 308, the network calculates the average number, Y, of available REs in one ECCE for EPDCCH in the PRB. In one embodiment, when the number of ECCEs for EPDCCH in a PRB is fixed to be N=2 or 4 and the number of available REs for EPDCCH in the PRB is already obtained as X, the average number of available REs in one ECCE is obtained by Y=X/N.

According to Step 310, the network selects an aggregation level, i, from the first aggregation level set which is selected according to Step 306. In one embodiment of the present invention, the selected aggregation level is the minimum level in the aggregation level set. For example, the network selects the minimum aggregation level i=1 from the aggregation level set {1, 2, 4, 8, 16}. The network can select other aggregation level from the aggregation level set.

According to Step 312, the network calculates the number, Z, of available REs in an EPDCCH for the selected aggregation level i according to the selected aggregation level i and the average number Y of available REs in one ECCE, that is, Z=i*Y. In one embodiment, when the selected aggregation level i is equivalent to the fixed number N of ECCEs for EPDCCH in the PRB, the number Z of available REs in an EPDCCH for the selected aggregation level is equivalent to X; Z=N*(X/N)=X.

According to Step 314, the network selects a first candidate number set from a plurality of blind decoding candidate number sets according to a second comparison result between the number Z of available REs in the EPDCCH for the selected aggregation level i and a second threshold, wherein each blind decoding candidate number set comprises a plurality of numbers, each number indicating the number of blind decoding candidates associated with a corresponding aggregation level. For example, when the blind decoding candidate number sets are configured or predetermined to be {6, 6, 2, 1, 1} and {8, 4, 2, 1, 1}, the network selects the candidate number set {6, 6, 2, 1, 1} when the second comparison result indicates that the number Z of available REs in the EPDCCH for the selected aggregation level i is not greater than the second threshold (e.g. 40 REs); otherwise, the network selects the candidate number set {8, 4, 2, 1, 1} when the second comparison result indicates that the number Z of available REs in the EPDCCH for the selected aggregation level i is greater than the second threshold.

Please note that the second threshold may be changed when the selected aggregation level is changed, since the number Z of available REs in the EPDCCH is associated with the selected aggregation level. For example, when the selected aggregation level i=1, the second threshold is 40 REs; and when the selected aggregation level i=2, the second threshold is also multiplied to be 80 REs.

According to step 316, the network determines an aggregation level, k, from the first aggregation level set which is selected according to Step 306, for transmitting control information in an EPDCCH to a UE, and the network determines the number of blind decoding candidates corresponding to the determined aggregation level k from the first candidate number set. For example, when the network have selected the aggregation level set {1, 2, 4, 8, 16} according to Step 306 and have selected {8, 4, 2, 1, 1} to be the first candidate number set according to Step 314, the network then determines the aggregation level k=1 from the aggregation level set {1, 2, 4, 8, 16} and determines the number of blind decoding candidates is 8 which is corresponding to the aggregation level k=1. Next, according to Step 318, the network transmits control information dedicated to a UE in EPDCCH according to the determined number of blind decoding candidates and the determined aggregation level.

Please note that the network can determine the aggregation level k for transmitting control information to a UE according to channel conditions, and when the network fails to transmit control information by using the currently determined aggregation level and the corresponding number of blind decoding candidates, e.g. when in the condition that EPDCCH resources corresponding to the determined aggregation level have been scheduled for another UE, the network may determine a higher aggregation level and select its corresponding number of blind decoding candidates, to try transmitting the control information to the UE.

In a word, in merit of multiple blind decoding candidate number sets which can be selected for a aggregation level and the process 30 (especially Step 314), the network can take both the number of blind decoding candidates and the aggregation level into consideration, when transmitting the control information in the EPDCCH. Thus, the problem of transmitting the control information in the EPDCCH efficiently while maintaining a low blocking probability and efficient resource usage is solved.

Figure 4:
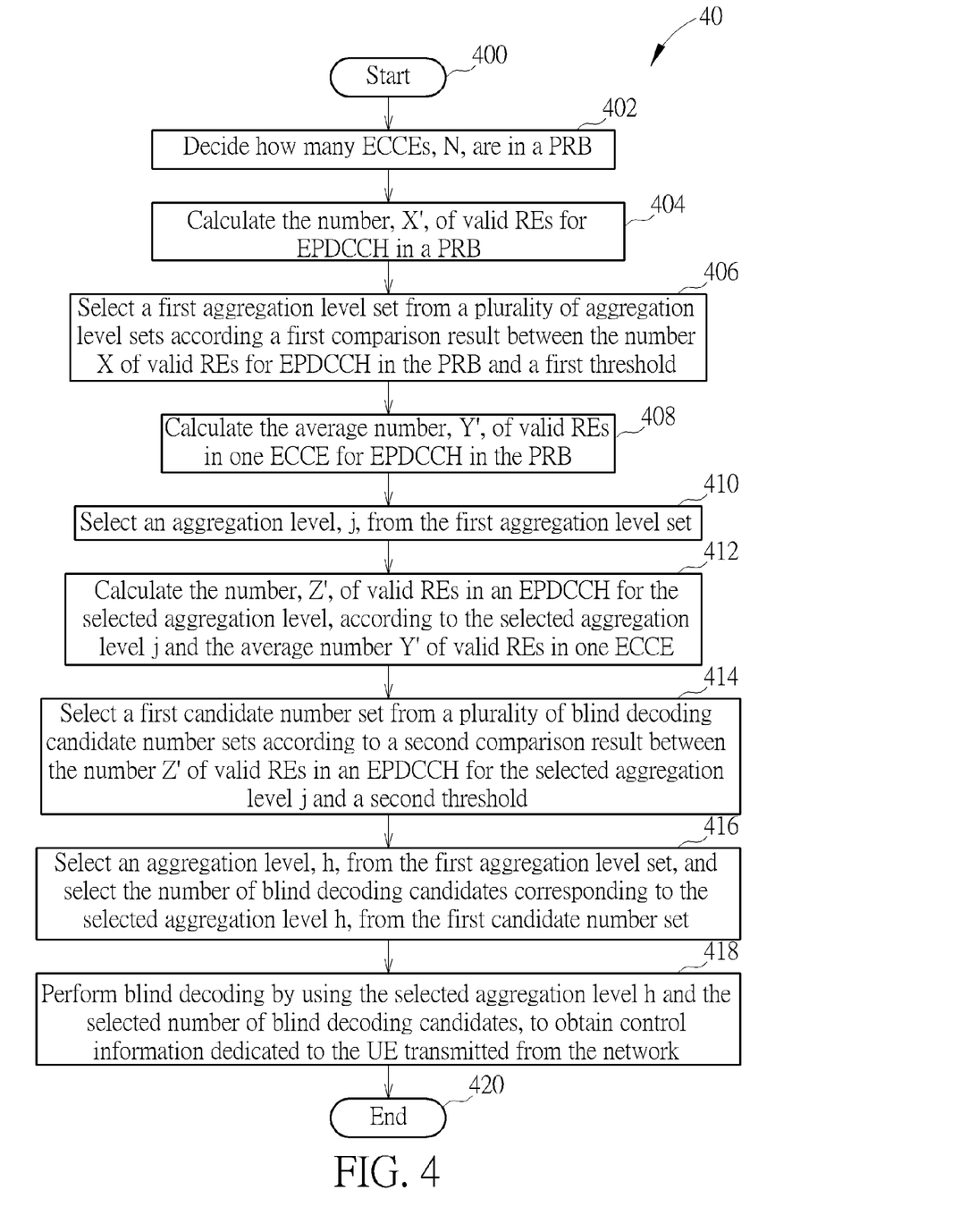
FIG. 4 is a flowchart of a process according to an example of the present invention.

Please refer to FIG. 4, which is a flowchart of a process 40 according to an example of the present invention. The process 40 is utilized in a UE shown in FIG. 1, for handling an EPDCCH. The process 40 may be compiled into the program code 214 and includes the following steps:

Step 400: Start.

Step 402: Decide how many ECCEs, N, are in a PRB.

Step 404: Calculate the number, X', of valid REs for EPDCCH in a PRB.

Step 406: Select a first aggregation level set from a plurality of aggregation level sets according a first comparison result between the number X of valid REs for EPDCCH in the PRB and a first threshold.

Step 408: Calculate the average number, Y', of valid REs in one ECCE for EPDCCH in the PRB.

Step 410: Select an aggregation level, j, from the first aggregation level set.

Step 412: Calculate the number, Z', of valid REs in an EPDCCH for the selected aggregation level, according to the selected aggregation level j and the average number Y' of valid REs in one ECCE.

Step 414: Select a first candidate number set from a plurality of blind decoding candidate number sets according to a second comparison result between the number Z' of valid REs in an EPDCCH for the selected aggregation level j and a second threshold.

Step 416: Select an aggregation level, h, from the first aggregation level set, and select the number of blind decoding candidates corresponding to the selected aggregation level h, from the first candidate number set.

Step 418: Perform blind decoding by using the selected aggregation level h and the selected number of blind decoding candidates, to obtain control information dedicated to the UE transmitted from the network.

Step 420: End.

Though the process 40 is utilized in the UE, Step 402 to Step 416 are performed in a similar way as Step 302 to Step 316 of the process 30, in view of UE side. Thus, the UE can find out a proper aggregation level set (according to Step 406) and a proper candidate number set (according to Step 414), then select the proper number of blind decoding candidates to perform blind decoding to obtain the control information dedicated to the UE.

According to Step 404, the UE calculates the number, X', of valid REs for EPDCCH in a PRB. According to Step 406, the UE selects a first aggregation level set from a plurality of aggregation level sets according a first comparison result between the number X' of valid REs for EPDCCH in the PRB and a first threshold, wherein each aggregation level set comprising numbers indicating different aggregation levels. For example, the UE selects the aggregation level set {1, 2, 4, 8, 16} when the first comparison result indicates that the number X' of valid REs for EPDCCH in the PRB is greater than the first threshold (e.g. 104 REs); otherwise, the UE selects the aggregation level set {2, 4, 8, 16, 32} when the first comparison result indicates that the number X' of valid REs for EPDCCH in the PRB is not greater than the first threshold.

According to Step 408, the UE calculates the average number, Y', of valid REs in one ECCE for EPDCCH in the PRB. In one embodiment, when the number of ECCEs for EPDCCH in a PRB is fixed to be N=2 or 4 and the number of valid REs for EPDCCH in the PRB is already obtained as X', the average number of valid REs in one ECCE is obtained by Y'=X'/N.

According to Step 410, the UE selects an aggregation level, j, from the first aggregation level set which is selected according to Step 406. In one embodiment of the present invention, the selected aggregation level is the minimum level in the aggregation level set. For example, the network selects the minimum aggregation level j=1 from the aggregation level set {1, 2, 4, 8, 16}. The UE is able to select other aggregation level from the first aggregation level set.

According to Step 412, the UE calculates the number, Z', of valid REs in an EPDCCH for the selected aggregation level j according to the selected aggregation level j and the average number Y' of valid REs in one ECCE, that is, Z'=j*Y'. In one embodiment, when the selected aggregation level j is equivalent to the fixed number N of ECCEs for EPDCCH in the PRB, the number Z' of valid REs in an EPDCCH for the selected aggregation level is equivalent to X'.

According to Step 414, the UE selects a first candidate number set from a plurality of blind decoding candidate number sets according to a second comparison result between the number Z' of valid REs in the EPDCCH for the selected aggregation level j and a second threshold, wherein each blind decoding candidate number set comprises a plurality of numbers, each number indicating the number of blind decoding candidates associated with a corresponding aggregation level. For example, when the blind decoding candidate number sets are configured or predetermined to be {6, 6, 2, 1, 1} and {8, 4, 2, 1, 1}, the UE selects the candidate number set {6, 6, 2, 1, 1} when the second comparison result indicates that the number Z' of valid REs in the EPDCCH for the selected aggregation level j is not greater than the second threshold (e.g. 40 REs); otherwise, the UE selects the candidate number set {8, 4, 2, 1, 1} when the second comparison result indicates that the number Z' of valid REs in the EPDCCH for the selected aggregation level j is greater than the second threshold.

Please note that the second threshold may be changed when the selected aggregation level is changed, since the number Z' of valid REs in the EPDCCH is associated with the selected aggregation level. For example, when the selected aggregation level j=1, the second threshold is 40 REs; and when the selected aggregation level j=2, the second threshold is also multiplied to be 80 REs.

According to step 416, the UE selects an aggregation level, h, from the first aggregation level set which is selected according to Step 406 and selects the number of blind decoding candidates corresponding to the determined aggregation level h from the first candidate number set. For example, when the UE has selected the aggregation level set {1, 2, 4, 8, 16} according to Step 406 and has selected {8, 4, 2, 1, 1} to be the first candidate number set according to Step 414, the UE then selects the aggregation level h=1 from the aggregation level set {1, 2, 4, 8, 16} and selects the number of blind decoding candidates to be 8 which is corresponding to the aggregation level h=1.

Next, according to Step 418, the UE performs blind decoding by using the first aggregation level h and the selected number of blind decoding candidates, to obtain control information dedicated to the UE transmitted from the network. Please note that the UE may fail to successfully decode the EPDCCH by using a selected number of blind decoding candidates and a determined aggregation level, and in this situation, the UE may try selecting another number of blind decoding candidates corresponding to another (e.g. a higher) aggregation level to perform blind decoding until obtaining the control information dedicated to the UE. For example, the UE may fail to successfully decoding EPDCCH by using the number of blind decoding candidates=8 selected from the decoding candidate number set {8, 4, 2, 1, 1}, corresponding to the aggregation level h=1. That is, the UE try decoding 8 EPDCCH candidates and all fails. In this situation, the UE may further select the number of blind decoding candidates to be 4 from the same decoding candidate number set {8, 4, 2, 1, 1}, corresponding to a higher aggregation level h=2, and keeping blind decoding until obtain the control information dedicated to the UE.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method for handling the EPDCCH. The control information can be transmitted via the EPDCCH efficiently while a low blocking probability and efficient resource usage is maintained. As a result, the system capacity can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling an enhanced physical downlink control channel (EPDCCH) for a network of a wireless communication system, the method comprising:
calculating the average number of available resource elements (REs) in one control channel element (CCE) for physic downlink control channel (PDCCH) in a physical resource block (PRB);
selecting an aggregation level from a first aggregation level set of the plurality of aggregation level sets;
calculating the number of available REs in a PDCCH for the selected aggregation level according to the selected aggregation level and the average number of available REs in one CCE;
selecting a first candidate number set from a plurality of blind decoding candidate number sets according to a second comparison result between the number of available REs in the PDCCH for the selected aggregation level and a second threshold, wherein each blind decoding candidate number set comprises a plurality of numbers, each number indicating the number of blind decoding candidates associated with a corresponding aggregation level; and
determining an aggregation level from the first aggregation level set and determining the number of blind decoding candidates corresponding to the determined aggregation level from the first candidate number set, for transmitting control information dedicated to a user equipment (UE) of the wireless communication system.

2. The method of claim 1, further comprising:
deciding how many CCEs are in one PRB;
calculating the number of available REs for the PDCCH in a PRB; and
selecting the first aggregation level set from the plurality of aggregation level sets according a first comparison result between the number of available REs for PDCCH in the PRB and a first threshold, wherein each aggregation level set comprising numbers indicating different aggregation levels.

3. The method of claim 1, further comprising:
transmitting control information dedicated to the UE in the PDCCH by using the determined aggregation level and determined number of blind decoding candidates.

4. The method of claim 3, further comprising:
when the network fails to transmit control information dedicated to the UE by using the currently determined aggregation level and the corresponding number of blind decoding candidates, determining a higher aggregation level and the number of blind decoding candidates corresponding to the higher aggregation level, to keep trying transmitting the control information dedicated to the UE.

5. The method of claim 1, wherein the PDDCH is enhanced PDCCH (EPDCCH) and the CCE is enhanced CCE (ECCE) defining in an Advanced Long Term Evolution (LTE-A) system.

6. A method of handling an enhanced physical downlink control channel (EPDCCH) for a communication device of a wireless communication system, the method comprising:
calculating the average number of valid resource elements (REs) in one control channel element (CCE) for physic downlink control channel (PDCCH) in a physical resource block (PRB);
selecting an aggregation level from a first aggregation level set of the plurality of aggregation level sets;
calculating the number of valid REs in a PDCCH for the selected aggregation level according to the selected aggregation level and the average number of valid REs in one CCE;
selecting a first candidate number set from a plurality of blind decoding candidate number sets according to a second comparison result between the number of valid REs in the PDCCH for the selected aggregation level and a second threshold, wherein each blind decoding candidate number set comprises a plurality of numbers, each number indicating the number of blind decoding candidates associated with a corresponding aggregation level; and
selecting an aggregation level from the first aggregation level set and selecting the number of blind decoding candidates corresponding to the selected aggregation level from the first candidate number set, for performing blind decoding to obtain control information dedicated to the UE transmitted from a network of the wireless communication system.

7. The method of claim 6, further comprising:
deciding how many CCEs are in one PRB;
calculating the number of valid REs for the PDCCH in a PRB; and
selecting the first aggregation level set from the plurality of aggregation level sets according a first comparison result between the number of valid REs for PDCCH in the PRB and a first threshold, wherein each aggregation level set comprising numbers indicating different aggregation levels.

8. The method of claim 6, further comprising:
performing blind decoding by using the selected aggregation level and the selected number of blind decoding candidates, to obtain control information dedicated to the UE transmitted from the network.

9. The method of claim 8, further comprising:
when the UE fails to successfully decode the PDCCH by using the selected aggregation level and the selected number of blind decoding candidates, selecting a higher aggregation level and selecting the number of blind decoding candidates corresponding to the higher aggregation level, to keep performing blind decoding until obtaining the control information dedicated to the UE.

10. The method of claim 6, wherein the PDDCH is enhanced PDCCH (EPDCCH) and the CCE is enhanced CCE (ECCE) defining in an Advanced Long Term Evolution (LTE-A) system.

* * * * *